(12) United States Patent
Chiang et al.

(10) Patent No.: US 6,335,806 B1
(45) Date of Patent: Jan. 1, 2002

(54) DOCUMENT PRESSING STRUCTURE IN SCANNING DEVICE

(75) Inventors: Te-Ming Chiang; Chao-Ming Lee; Ming-Sho Hsu, all of Hsi Chih (TW)

(73) Assignee: Primax Electronics Ltd., Taipei Hsien (TW)

( * ) Notice: Subject to any disclaimer, the term of this patent is extended or adjusted under 35 U.S.C. 154(b) by 0 days.

(21) Appl. No.: 09/121,529

(22) Filed: Jul. 24, 1998

(30) Foreign Application Priority Data

Jun. 17, 1998 (TW) .......................................... 87209672

(51) Int. Cl.[7] ................................................. H04N 1/04
(52) U.S. Cl. ....................................... 358/474; 382/312
(58) Field of Search ................................. 358/474, 497, 358/501, 538, 401; 382/312, 315

(56) References Cited

U.S. PATENT DOCUMENTS 3,831,321 A * 8/1974 Johnson ........................ 49/465
4,150,896 A * 4/1979 Wakeman ..................... 355/75
4,577,960 A * 3/1986 Zambelli ....................... 355/75
4,961,000 A * 10/1990 Finkenzeller ................ 250/484
5,109,980 A * 5/1992 Matsuoka .................... 206/328
5,574,542 A * 11/1996 Brook ......................... 399/380
5,829,622 A * 11/1998 Neuman ...................... 220/230

* cited by examiner

Primary Examiner—Jerome Grant, II
Assistant Examiner—Negussie Worku
(74) Attorney, Agent, or Firm—Bacon & Thomas

(57) ABSTRACT

A document pressing structure is provided in a flatbed scanner for facilitating close contact between a document to be scanned and a scanning platform to maintain a constant depth of field. The document pressing structure includes a first coupling element mounted on the cover of the scanner, and a second coupling element mounted on the housing of the scanner. The first and the second coupling elements engage with each other when the cover is pivotally put down on the scanning platform so as to allow the cover to press a scanned face of the document close to the platform.

6 Claims, 4 Drawing Sheets

DOCUMENT PRESSING STRUCTURE IN SCANNING DEVICE

FIELD OF THE INVENTION

The present invention is related to a document pressing structure in a scanning device, and more particularly to a document pressing structure in a flatbed scanner.

BACKGROUND OF THE INVENTION

To use a flatbed scanner, a document is placed on a glass platform of the scanner, and then pressed by a cover for positioning, and thereafter, the scanner is actuated to perform scanning operations.

It is generally required that the entire scanned face of the document press against the glass platform as close as possible owing to the requirement of constant depth of field for the sensing device, such as a charge coupled device (CCD) or a contact image sensor used, in the scanner (CIS) to pick up the image of the scanned face. Especially for a CIS, the closeness between the document and the platform is strictly required.

As known, the closeness between a document and a platform on which the document is placed cannot be assured if the document is simply placed on the platform without exerting thereon any pressing force. For example, the creases of the document are likely to cause the depth of field to be beyond an acceptable range. Therefore, a pressing force is generally exerted on the document in order to press the entire scanned face of the document against the platform close.

Please refer to FIG. 1 which is an exploded structural diagram schematically showing the pressing of the document with a weighty material in a conventional flatbed scanner. The scanner shown in FIG. 1 includes a cover frame 11, a metal plate 12, polyurethane foam 13, a document pressing plate 14, a scanner housing 15, and a glass platform 16. The metal plate 12, polyurethane foam 13, and document pressing plate 14 are combined together into the cover frame 11 to form a cover 10. When a document is to be scanned, the document is placed on the platform 16 and the cover 10 is pivoted onto the documents so as to press the document between the pressing plate 14 and the glass platform 16. The weight of the metal plate 12 provides a downward pressing force for the document to press the document close to the platform 16. The polyurethane foam 13 serves as a cushion to protect the glass platform 16 and further enhance the close contact between the scanned face of the document and the platform 16.

Although such a cover provides good pressing effect, the presence of the metal plate not only results in high cost of the scanner, but also renders inconvenient the lifting operation of a user owing to its high weight.

SUMMARY OF THE INVENTION

Therefore, an object of the present invention is to provide a document pressing structure for a flatbed scanner which causes a document to be scanned to be exposed close to a scanning platform of the scanner without adding weight to the cover of the scanner.

The present invention is related to a document pressing structure in a flatbed scanner. The flatbed scanner includes a housing and a cover over the housing. A transparent platform is mounted on a top surface of the housing for supporting a document to be scanned, and the cover has a first side thereof pivotally connected to a first side of the top surface of the housing for shielding the document from external light when the cover is pivoted to a closed position. The document pressing structure according to the present invention includes a First coupling element mounted on a second side of the cover, and a second coupling element mounted on a second side of the top surface, wherein the first and the second coupling elements are engaged with each other when the cover is pivoted to the closed position so as to allow the cover to press a scanned face of the document close to the transparent platform.

Preferably, the transparent platform is a glass platform. The second side of the cover is opposite to the first side of the cover, and the second side of the top surface is opposite to the first side of the top surface.

In a preferred embodiment, the first coupling element is a downwardly depending flexible piece with a horizontal projection, the second coupling element is a recess in a complementary projecting member, and when the flexible piece slides into the recess, upper bevel of the projection engages a lower bevel forming an upper surface of the recess when the cover is pivoted to the closed position.

In another preferred embodiment, the first coupling element is a magnetic piece inlayed in the cover, the second coupling element is another magnetic piece inlayed in the housing, and the two magnetic pieces are engaged with each other by magnetic force when the cover is pivoted to the closed position.

BRIEF DESCRIPTION OF THE DRAWING

The present invention may best be understood through the following description with reference to the accompanying drawings, in which.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 1:
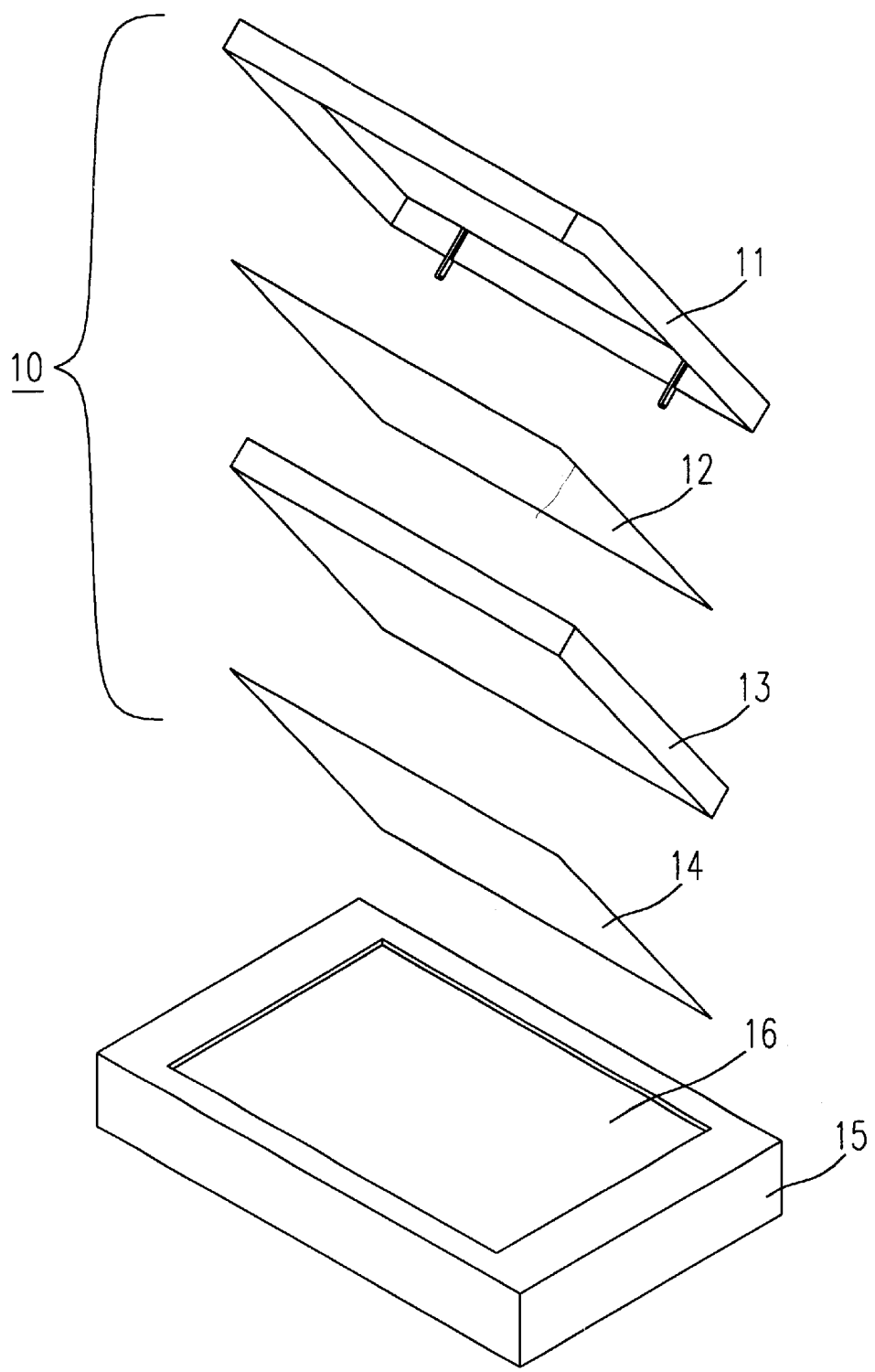
FIG. 1 is an exploded isometric view schematically showing a document pressing structure in a conventional flatbed scanner.
Figure 2:
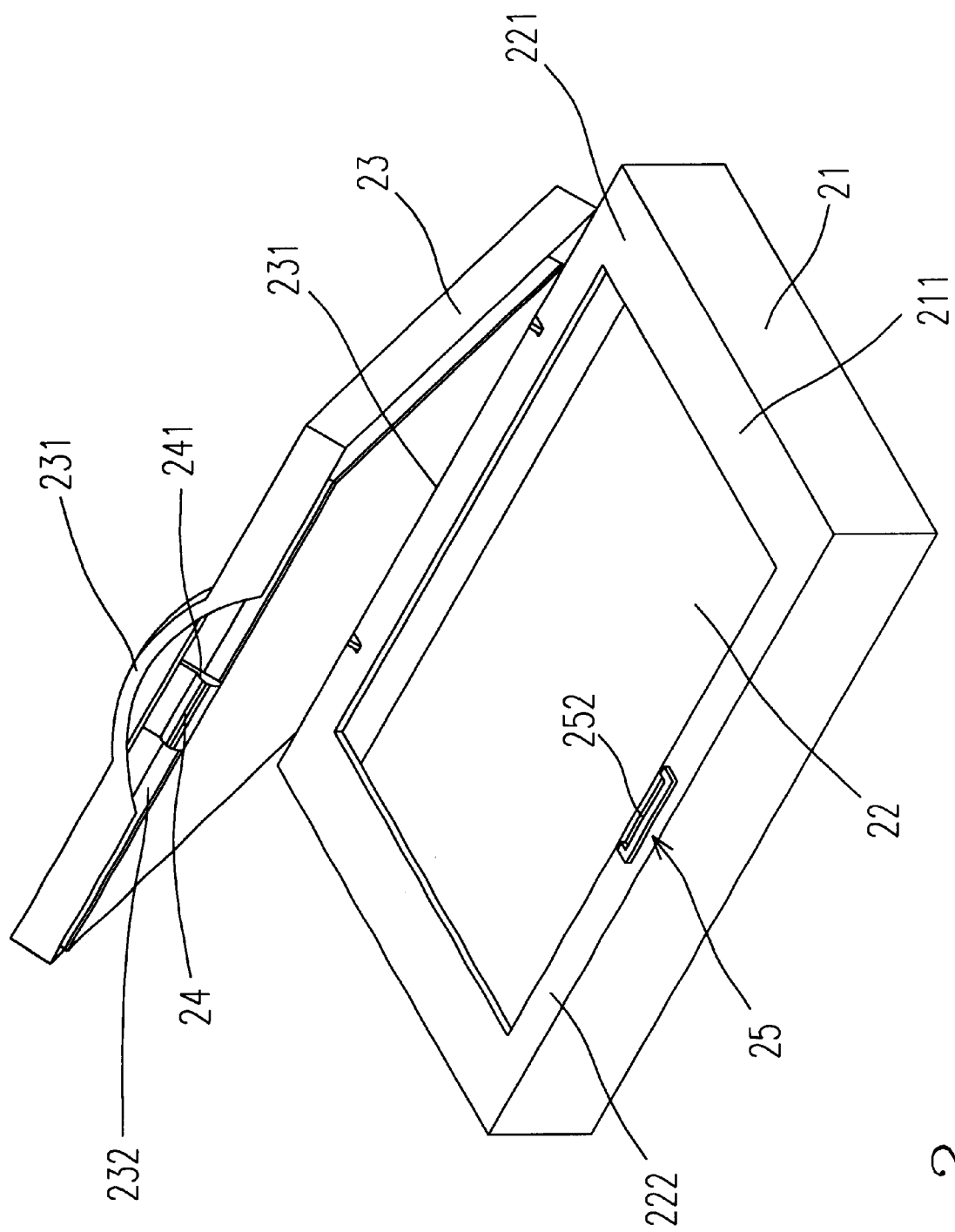
FIG. 2 is a schematic diagram showing a preferred embodiment of a document pressing structure in a flatbed scanner according to the present invention, in which the document pressing structure is in a document releasing mode.
Figure 3:
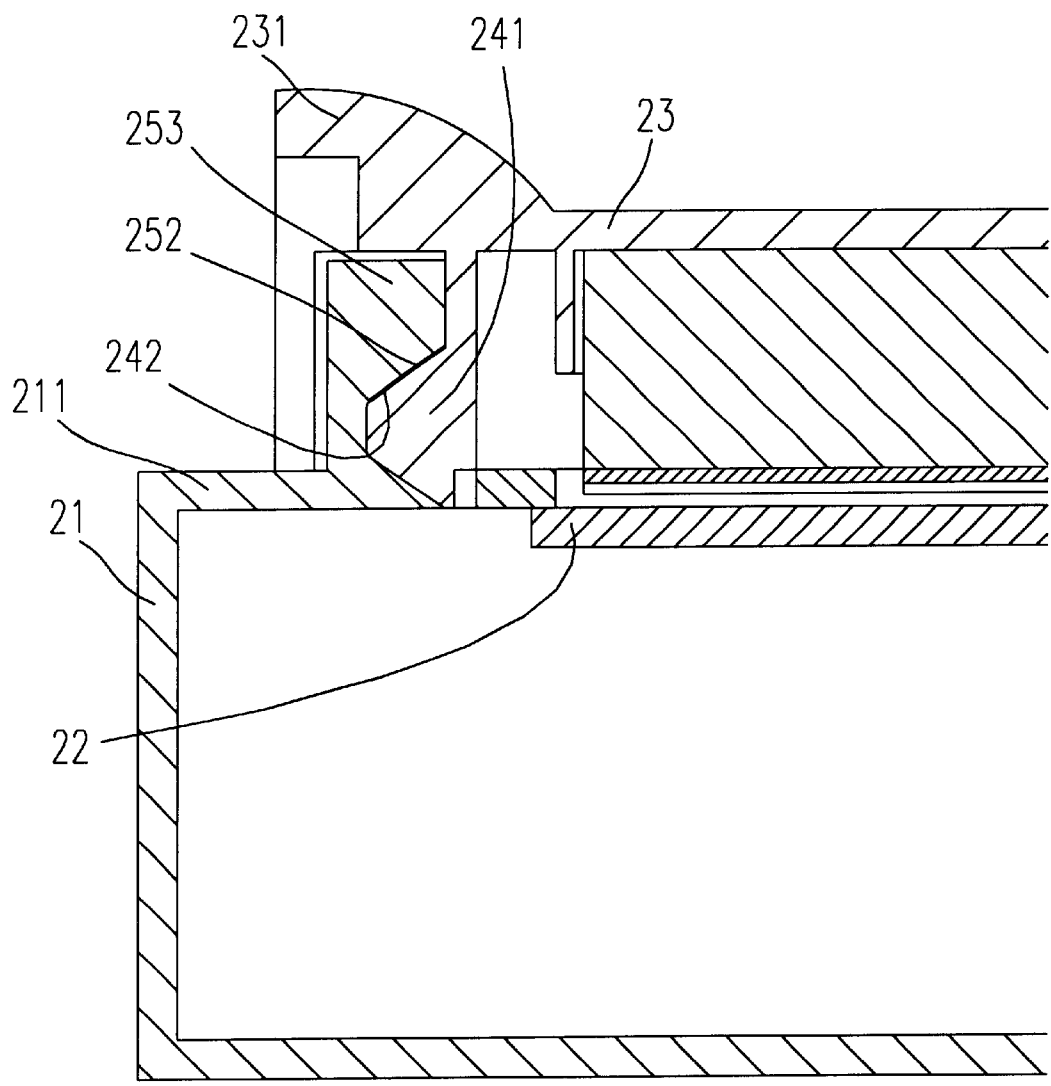
FIG. 3 is a cross-sectional diagram showing the document pressing structure of FIG. 2, in which the document pressing structure is in a document-pressing mode.

Please refer to FIG. 2, which schematically shows a preferred embodiment of a document pressing structure in a flatbed scanner according to the present invention. The elements shown in FIG. 2 includes a housing 21 of the scanner, a glass platform 22 mounted on a top surface 211 of the housing 21, a cover 23 having a side 231 thereof pivotally connected to a side 221 of the top surface 211, a flexible piece 24 depending from a side 232 of the cover 23, and a recess 25 arranged on a side 222 of the top surface 211. The flexible piece 24 is integrally formed with a horizontal projection 241, arranged to corporate with an recess 25 in a complementary projection member 253 (FIG. 3).

When a document is placed on the platform 22 and is ready to be scanned, the cover 23 is pivoted down onto a document located on the platform 22. Meanwhile, the hanging bump 241 slides into the recess 25 from the opening 252 of the recess 25 on the top surface 211, as shown in FIG. 3. An upper bevel 242 of the projection 241 is engaged with and stopped by a lower bevel 253 of the complimentary projection member 253 that the cover 23 is firmly attached to the housing 21, and the document (not shown) can be pressed into a plane between the cover 23 and the platform 22. When the document is to be released, the user exerts an upward force on a hollow convex portion 231 of the cover 23 to make the flexible piece 24 slide out of the recess 25 so as to allow the cover 23 to be detached from the housing 21. Since the document is pressed on the platform via the assembling of the flexible piece and the recess rather than the weight of the cover, the cover of the scanner can be free of metal plate as that provided in the conventional scanner cover. The reduction of the cover weight owing to the absence of the metal plate makes the lifting operation of the cover easier and more convenient.

Figure 4:
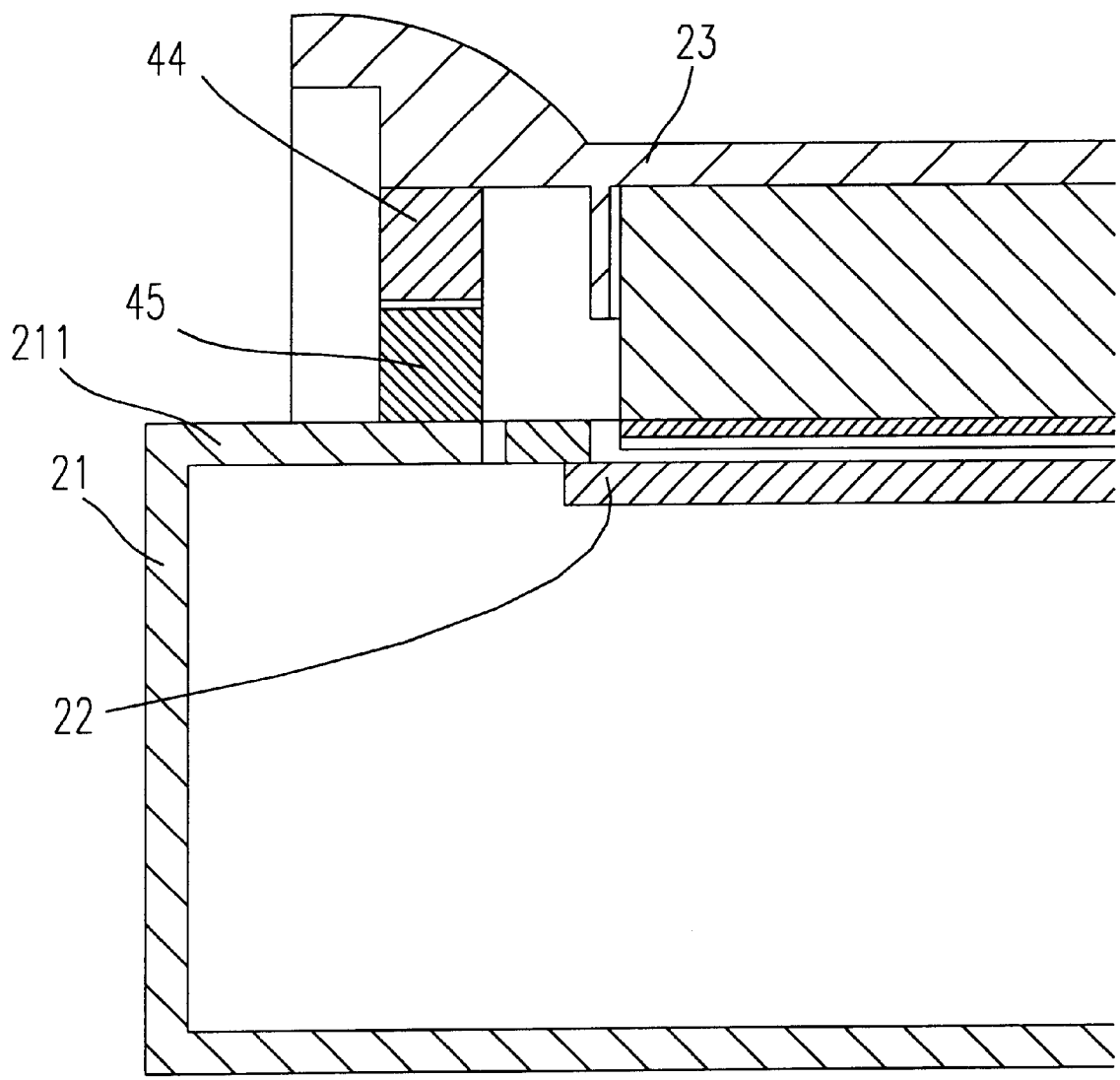
FIG. 4 is a schematic diagram showing another preferred embodiment of a document pressing structure in a flatbed scanner according to the present invention, in which the document pressing structure is in a document-releasing mode.

In addition to the combination of the flexible piece and the recess described above as a document pressing structure according to the present invention, many other types of coupling elements can be arranged on the cover and the housing, respectively, to engage and disengage the cover with the housing. For example, as shown in FIG. 4, two magnetic pieces 44 and 45 inlayed in the cover 23 and the housing 21, respectively, can be provided as a document pressing structure to have the cover 23 attached to the housing 21 and have the document in close contact with the platform 22.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A document pressing structure in a flatbed scanner, said flatbed scanner including a housing having a top surface on which is mounted a transparent platform, and a cover having a first side pivotally connected to a first side of said top surface of said housing and arranged to be pivoted into a closed position in which a document that has been placed on said transparent platform is shielded from external light, said document pressing structure comprising:

a first coupling element mounted on a second side of said cover; and a second coupling element engaged mounted on a second side of said top surface of said scanner and engaged with said first coupling element when said cover is pivoted to said closed position so as to couple said cover to said top surface of said scanner and thereby cause said cover to press a scanned face of said document against said transparent platform.

2. The document pressing structure according to claim 1 wherein said transparent platform is a glass platform.

3. The document pressing structure according to claim 1 wherein said second side of said cover is opposite to said first side of said cover.

4. The document pressing structure according to claim 3 wherein said second side of said top surface is opposite to said first side of said top surface.

5. The document pressing structure according to claim 1 wherein said first coupling element is a flexible piece that depends from said second side of said cover and includes a projection, and said second coupling element is a recess in a complementary protecting member arranged to receive said projection and cause an upper bevel of said projection to engage a complementary lower bevel of said complementary projecting member when said cover is pivoted to said closed position.

6. The document pressing structure according to claim 1 wherein said first coupling element is a magnetic piece inlayed in said cover, said second coupling element is another magnetic piece inlayed in said housing, and said two magnetic pieces arc engaged with each other by magnetic force when said cover is pivoted to said closed position.

* * * * *